United States Patent
Tominaga et al.

(10) Patent No.: US 7,129,449 B2
(45) Date of Patent: Oct. 31, 2006

(54) INDUCTION HEATING COOKER

(75) Inventors: Hiroshi Tominaga, Kobe (JP); Naoaki Ishimaru, Mino (JP); Kiyoyoshi Takada, Kobe (JP); Tamotsu Izutani, Kobe (JP)

(73) Assignee: Matsushita Electric Industrial Co. Ltd. (JP)

( * ) Notice: Subject to any disclaimer, the term of this patent is extended or adjusted under 35 U.S.C. 154(b) by 0 days.

(21) Appl. No.: 10/535,679

(22) PCT Filed: Jul. 16, 2004

(86) PCT No.: PCT/JP2004/010532

§ 371 (c)(1),
(2), (4) Date: May 19, 2005

(87) PCT Pub. No.: WO2005/009082

PCT Pub. Date: Jan. 27, 2005

(65) Prior Publication Data

US 2006/0049178 A1     Mar. 9, 2006

(30) Foreign Application Priority Data

Jul. 17, 2003     (JP) .............................. 2003-198312

(51) Int. Cl.
*H05B 6/06* (2006.01)
*H05B 6/12* (2006.01)
*F24C 7/02* (2006.01)

(52) U.S. Cl. ...................... 219/627; 219/626; 219/667; 219/494; 99/325

(58) Field of Classification Search ........ 219/620–627; 99/325, 451; 374/142, 149; 340/584
See application file for complete search history.

(56) References Cited

U.S. PATENT DOCUMENTS 3,781,504 A * 12/1973 Harnden, Jr. ................ 219/622
6,169,486 B1 * 1/2001 Berkcan et al. ............. 340/584
6,320,169 B1 * 11/2001 Clothier ...................... 219/626

FOREIGN PATENT DOCUMENTS

| JP | 3-184295 A | 8/1991 |
| JP | 3-208288 A | 9/1991 |
| JP | 2002-75624 A | 3/2002 |
| JP | 2003-130366 A | 5/2003 |
| JP | 2003-151746 A | 5/2003 |
| WO | WO 2005/009082 A1 | 1/2005 |

* cited by examiner

*Primary Examiner*—Quang Van
(74) *Attorney, Agent, or Firm*—Rossi, Kimms & McDowell, LLP

(57) ABSTRACT

An induction heating cooker includes an infrared sensor for sensing an infrared intensity from a load pot, a waveguide for guiding infrared radiation from the load pot to the infrared sensor, a first magnetism-proofing unit and a second magnetism-proofing unit for reducing magnetic fluxes leaking from a heating coil. Placement of the waveguide at a position lower than an upper surface of the second magnetism-proofing unit reduces self-heating of the waveguide due to magnetic flux supplied from the heating coil. As a result, a temperature rise of the infrared sensor due to radiation heat from the waveguide can be reduced, and an accuracy of sensing a temperature by the infrared sensor can be improved.

8 Claims, 4 Drawing Sheets

INDUCTION HEATING COOKER

This application is a U.S. National Phase Application of PCT International Application PCT/JP2004/010532, filed Jul. 16, 2004.

TECHNICAL FIELD

The present invention relates to induction heating cookers employing an infrared sensor.

BACKGROUND ART

One of conventional induction heating cookers is disclosed in Japanese Patent Unexamined Publication No. H03-184295, and this cooker employs an infrared sensor for detecting a temperature of a load pot. The infrared sensor directly detects an infrared ray radiated from the pot base, so that a temperature detection of excellent thermal response can be achieved. However, in this conventional cooker, use of an infrared sensor having a wide view angle fails in detecting a correct temperature because the sensor is subjected to infrared rays other than that from the pot base.

DISCLOSURE OF INVENTION

The induction heating cooker of the present invention comprises the following elements:
  a heating coil for heating a load pot;
  an inverter circuit for supplying a high-frequency current to the heating coil;
  an infrared sensor for detecting an infrared intensity from a load pot;
  a temperature calculating unit for calculating a temperature of a load pot from an output of the infrared sensor;
  a control unit for controlling an output of the inverter circuit in response to an output of the calculating unit;
  a first magnetism-proofing unit, disposed under the heating coil, for converging magnetic fluxes;
  a second magnetism-proofing unit, disposed between the heating coil and the infrared sensor, for converging magnetic fluxes; and
  a waveguide, disposed under an upper surface of the second magnetism-proofing unit, for guiding infrared radiation from the load pot up to the infrared sensor.

In the foregoing structure, the presence of the waveguide allows reducing influence from infrared radiation other than that radiated from the pot base. The foregoing placement of the first and second magnetism-proofing units allows converging magnetic fluxes leaked from the heating coil to those magnetism-proofing units, so that self-heating of the waveguide due to the leakage magnetic fluxes can be reduced. This structure allows reducing a temperature rise of the infrared sensor due to radiation heat from the waveguide, so that an accuracy of temperature detection by the infrared sensor can be improved.

DETAILED DESCRIPTION OF PREFERRED EMBODIMENTS

Exemplary embodiments of the present invention are demonstrated hereinafter with reference to the accompanying drawings.

First Exemplary Embodiment

Figure 1:
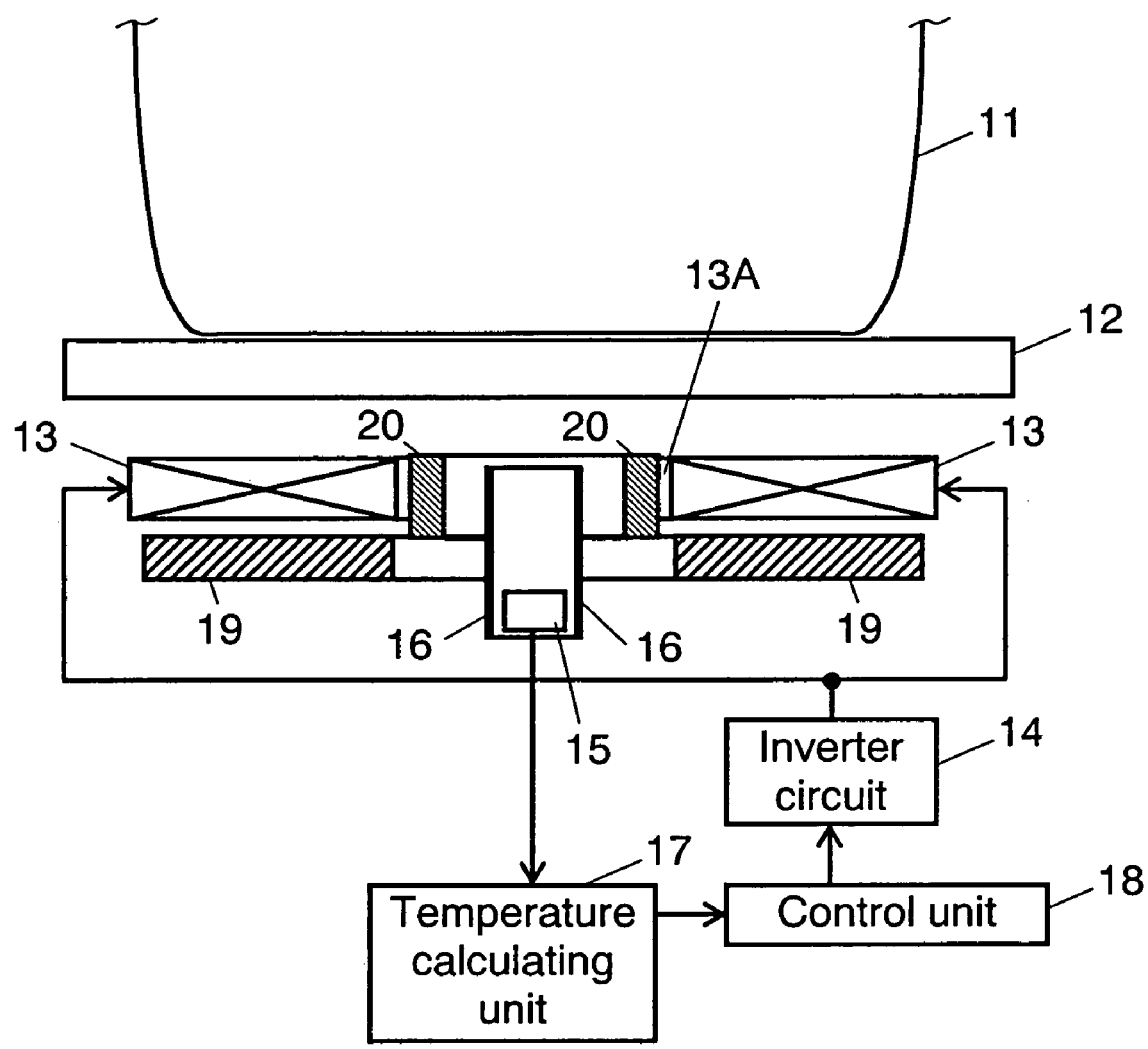
FIG. 1 shows a sectional view illustrating a structure of an induction heating cooker in accordance with a first exemplary embodiment of the present invention.

FIG. 1 shows a sectional view illustrating a structure of an induction heating cooker in accordance with the first exemplary embodiment of the present invention. FIG. 2A–FIG. 2E show a sectional view illustrating relations between a heating coil, a waveguide, and magnetism-proofing units of the induction heating cooker shown in FIG. 1.

A structure of the induction heating cooker of the first embodiment is described with reference to FIG. 1. Heating coil 13 has opening 13A at its center, and a winding wire wound around opening 13A. Running of a high-frequency current through coil 13 generates a high-frequency magnetic field, thereby providing load pot 11 placed on top plate 12 with induction-heating. Inverter circuit 14 supplies a high-frequency current to heating coil 13. Infrared sensor 15 is disposed under opening 13A and detects an intensity of infrared ray radiated from load pot 11. Temperature calculating unit 17 calculates a temperature of load pot 11 based on an output of sensor 15. Control unit 18 controls an output of inverter circuit 14 in response to an output of temperature calculating unit 17.

First magnetism-proofing unit 19 is radially disposed under the winding wire of coil 13. Because unit 19 is formed of rectangular-solid and bar-like ferrite of ferromagnetic substance and has a high permeability, it can converge magnetic fluxes, so that unit 19 can reduce magnetic fluxes leaking downward from coil 13. Second magnetism-proofing unit 20, of which plan view sighted from top plate 12 shapes like an arc and its sectional view shapes in a rectangle, is disposed between an inner rim of heating coil 13 and infrared sensor 15. Unit 20 is also formed of ferrite as first unit 19 is, and reduces magnetic fluxes leaking from heating coil 13 to infrared sensor 15.

Waveguide 16 is formed of a cylinder made of aluminum, i.e. non-magnetic metal, and the inside of cylinder is mirror-finished for a higher reflection factor. Waveguide 16 guides efficiently an infrared ray radiated from the base of load pot 11 to infrared sensor 15 disposed inside waveguide 16. The top face of waveguide 16 is disposed under the upper surface of second magnetism-proofing unit 20.

An operation of the foregoing induction heating cooker is demonstrated hereinafter. Supply of a high-frequency current from inverter circuit 14 to heating coil 13 provides the base of load pot 11 placed over heating coil 13 with induction heating. Then the base radiates an infrared ray in response to a temperature of the pot. The infrared ray permeates top plate 12 and is reflected on a mirror inside waveguide 16 before enters into infrared sensor 15, so that temperature calculating unit 17 converts the infrared ray into a temperature of the pot base.

Figure 2A:
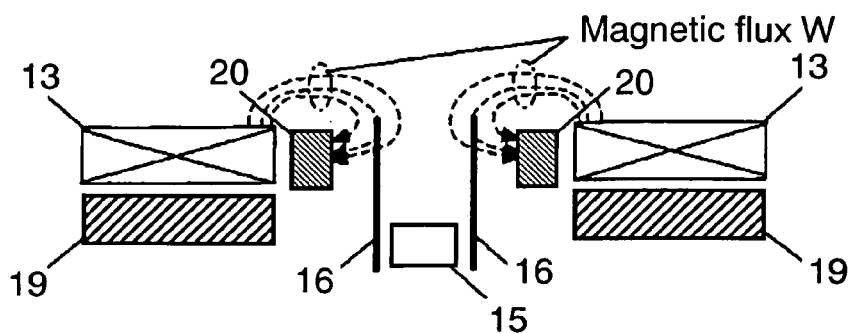
FIG. 2A–FIG. 2E show a sectional view illustrating relations between a heating coil, a waveguide, and magnetism-proofing units of the induction heating cooker shown in FIG. 1.

When a current runs through heating coil 13, parts of magnetic flux "W" radiated from heating coil 13 are converged at second magnetism-proofing unit 20 as shown in FIG. 2A–FIG. 2E. As shown in FIG. 2A, when the top (opening) of waveguide 16 is situated higher than the upper surface of second magnetism-proofing unit 20, the top blocks a path of magnetic fluxes to be converged at second magnetism-proofing unit 20. The magnetic flux thus intersects with vicinity of the upper surface of unit 20, so that waveguide 16 made of metal is induction-heated and generates greater heat. As a result, waveguide 16 radiates heat, thereby raising a temperature of infrared sensor 15 (e.g. temperature rise=30 K). Then a relative temperature of the pot base with respect to sensor 15 lowers, and temperature calculating unit 17 determines a temperature lower than an actual one of the pot base. This mechanism sometimes affects control unit 18 in preventing excessive temperature-rise as well as in controlling a temperature of load pot 11 when pot 11 is used for deep-flying food, boiling water, or cooking rice.

Figure 2B:
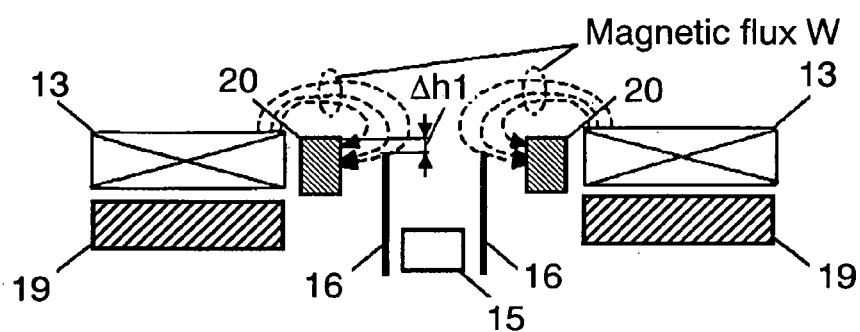

In this embodiment, as shown in FIG. 2B, the top face of waveguide 16 is situated lower than the upper surface of second magnetism-proofing unit 20 by $\Delta h1$ (e.g. 3 mm). This structure allows heating coil 13 to reduce the magnetic fluxes intersecting with waveguide 16, so that waveguide 16 becomes resistant to the induction heating, and the temperature rise of infrared sensor 15 due to the radiation heat from waveguide 16 can be reduced (e.g. temperature rise=10 K). As a result, infrared sensor 15 free from influence of the heat generated from wave guide 16 can steadily output a signal in response to a temperature of the pot base. Temperature calculator 17 calculates a temperature at the base of load pot 11 based on the output from infrared sensor 15, so that control unit 18 can control temperatures more accurately.

Figure 2C:
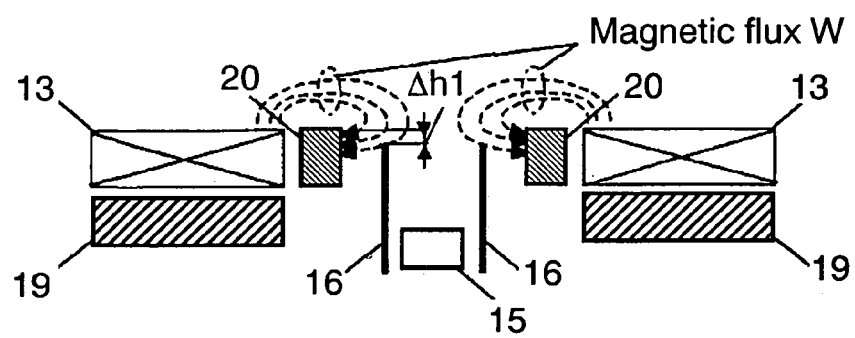

As shown in FIG. 2C, when the upper surface of second magnetism-proofing unit 20 is situated almost flush with the top surface of heating coil 13, the magnetic flux from the top surface of coil 13 travels a shorter distance to the upper surface of magnetism-proofing unit 20 than that shown in FIG. 2B. The convergence efforts of magnetic fluxes by second magnetism-proofing unit 20 thus becomes greater, so that the magnetic flux travelling through the center of heating coil 13 can be reduced. As a result, the foregoing structure suppresses waveguide 16 to generate heat, so that the temperature rise of infrared sensor 15 due to radiation heat from waveguide 16 can be reduced, and an accuracy of detecting a temperature by sensor 15 can be improved.

Figure 2D:
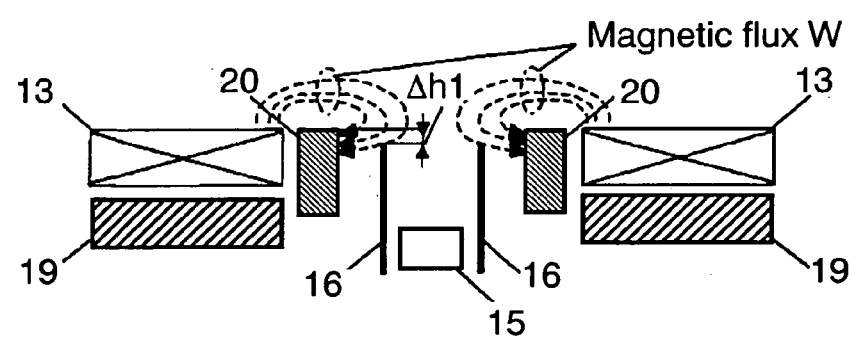

As shown in FIG. 2D, when a lower surface of second magnetism-proofing unit 20 is situated lower than a upper surface of first magnetism-proofing unit 19, parts of a lower lateral face of second magnetism-proofing unit 20 confront to parts of a center lateral face of heating coil 13 on first magnetism-proofing unit 19. This structure allows forming a magnetic path having a smaller magnetic resistance and a better convergent efficiency and running from the center of coil 13 to the lower section of coil 13. As a result, leakage fluxes from the lower section to the center of coil 13 can be reduced. The foregoing structure suppresses self-heating of waveguide 16, so that the temperature rise of infrared sensor 15 due to radiation heat from waveguide 16 can be reduced, and an accuracy of detecting a temperature by sensor 15 can be improved.

Figure 2E:
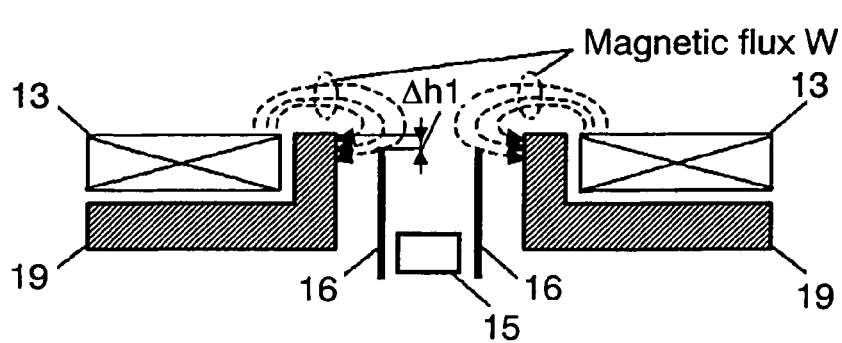

As shown in FIG. 2E, first magnetism proofing unit 19 and second one 20 are unitarily formed and its lateral sectional view shows like a letter "L", a space between first unit 19 and second unit 20 is thus eliminated. This structure allows further reducing the leakage flux from the lower section to the center of coil 13, and suppressing self-heating of waveguide 16. As a result, the temperature rise of infrared sensor 15 due to radiation heat from waveguide 16 can be reduced, and an accuracy of detecting a temperature by sensor 15 can be improved.

In this embodiment, waveguide 16 is formed of aluminum; however, it can be formed of copper. Use of such non-magnetic metal of excellent heat conduction further suppresses the self-heating of waveguide 16, so that the temperature rise at infrared sensor 15 due to radiation heat from waveguide 16 can be further reduced. As a result, more accurate temperature detection can be expected. Non-magnetic stainless steel having a greater specific resistance than aluminum can be used as long as its temperature rise does not involve any problems.

As discussed above, this first embodiment proves that the self-heating of waveguide 16, formed of non-magnetic metal, due to the magnetic flux from heating coil 13 can be suppressed. As a result, the temperature rise of infrared sensor 15 due to radiation heat from waveguide 16 can be reduced, and an accuracy of detecting a temperature by sensor 15 can be improved.

In this embodiment, waveguide 16 is formed of cylindrical non-magnetic metal; however, it can be formed of magnetic metal as long as the self-heating can be suppressed. The entire waveguide 16 is not necessarily formed of non-magnetic metal, but parts of it can be formed of non-magnetic metal. Mirror finished inner wall such as metal plating on inside the resin or metal thin film adhering to the inside of the resin of waveguide 16 can produce an advantage similar to what is discussed above.

A distance between second magnetism-proofing unit 20 and waveguide 16 should be long enough to reduce the self-heating of waveguide 16, so that this distance is only a factor specifying a horizontal position of waveguide 16. The temperature rise at waveguide 16 can acceptable as far as it does not affect the temperature control by control unit 18, and a temperature rise within such a range can produce an advantage similar to what is discussed above.

Second Exemplary Embodiment

Figure 3:
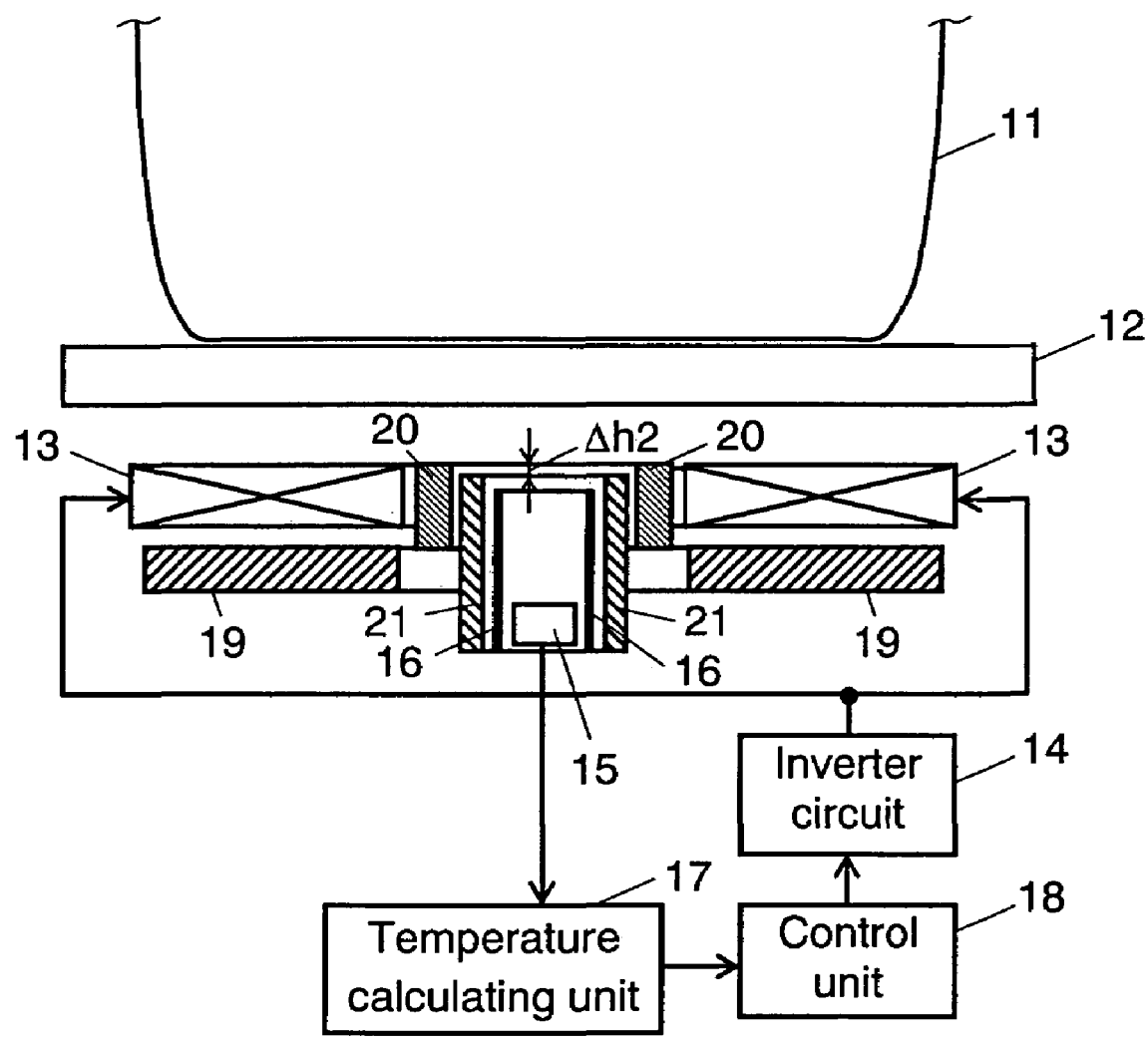
FIG. 3 shows a sectional view illustrating a structure of an induction heating cooker in accordance with a second exemplary embodiment of the present invention.
Figure 4:
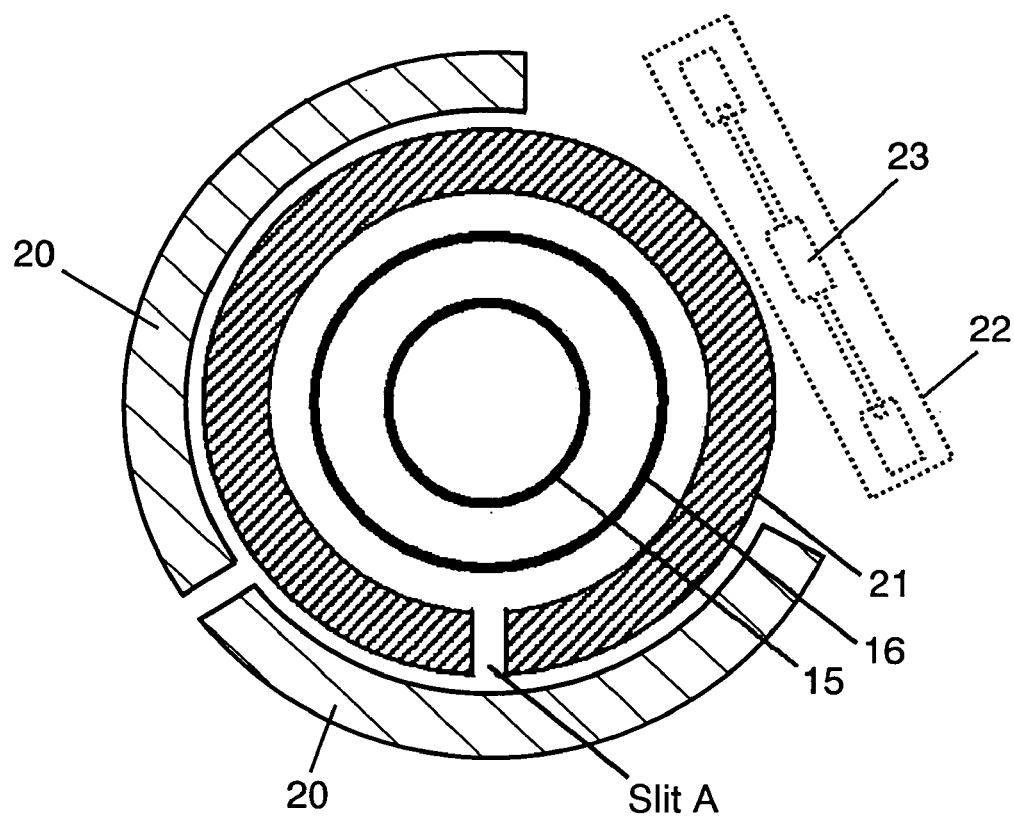
FIG. 4 shows a plan sectional view of a heat shielding unit of the induction heating cooker shown in FIG. 3.
Figure 5:
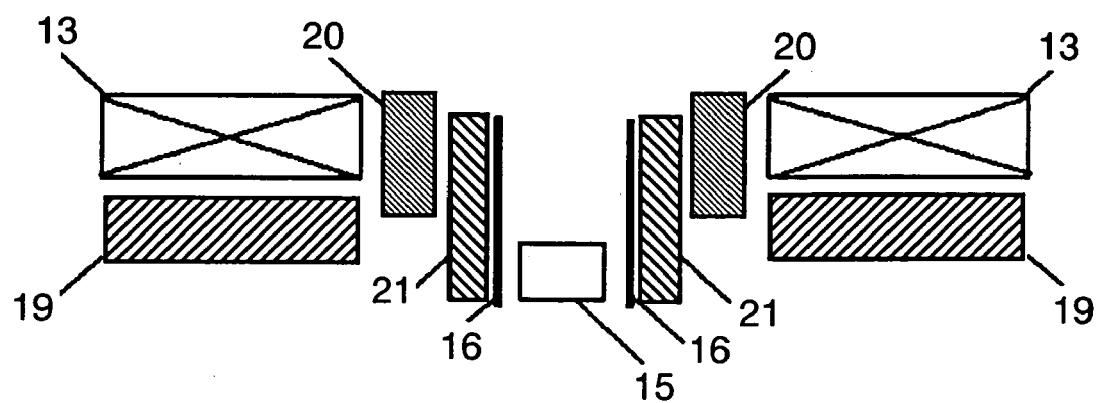
FIG. 5 shows a sectional view illustrating relations between a heating coil, a waveguide, and magnetism-proofing units of the induction heating cooker shown in FIG. 3.

FIG. 3 shows a sectional view illustrating a construction of the induction heating cooker in accordance with the second exemplary embodiment of the present invention. FIG. 4 shows a plan sectional view of a heat shielding unit used in the cooker shown in FIG. 3, and FIG. 5 shows a sectional view illustrating a relation between a heating coil, a waveguide, and magnetism-proofing units.

The construction of the cooker in this second embodiment is basically the same as that in the first embodiment, so that different points are detailed here. As shown in FIG. 3, the cooker is additionally equipped with cylindrical heat-shielding unit 21 for reducing a temperature change at the elements of infrared sensor 15. Heat shielding unit 21 is formed of non-magnetic metal of excellent heat conduction such as copper or aluminum for obtaining a uniform temperature. Unit 21 is disposed between waveguide 16 and second magnetism-proofing unit 20 and situated lower than an upper surface of magnetism-proofing unit 20.

An operation of the foregoing induction heating cooker is demonstrated hereinafter. Supply of a high-frequency current from inverter circuit 14 to heating coil 13 provides load pot 11 placed over heating coil 13 with induction heating. The pot base radiates an infrared ray in response to a temperature of pot 11. The infrared ray permeates through top-plate 12 and is reflected on a mirror disposed inside waveguide 16 before it enters into infrared sensor 15. The infrared ray is converted into a temperature of the pot base by temperature calculating unit 17.

When a current runs through heating coil 13, parts of a magnetic flux radiated from heating coil 13 are converged at second magnetism-proofing unit 20. The top face of heat shielding unit 21 is situated lower than the upper surface of second magnetism-proofing unit 20 by Δh2 (e.g. 3 mm), so that shielding unit 21 is resistant to induction heating. Waveguide 16 situated further inside than shielding unit 21 is more resistant to induction heating, so that a temperature rise of infrared sensor 15 due to radiation heat from heat shielding unit 21 and wave guide 16 is further reduced than that of the first embodiment. As a result, infrared sensor 15 can steadily sense a signal, and temperature calculator 17 calculates a temperature at the base of load pot 11 based on the output from infrared sensor 15, so that control unit 18 can control temperatures more accurately.

As shown in FIG. 4, heat shielding unit 21 has slit "A" along at least one direction, and shapes cylindrically like letter "C" sighted from the top. This structure allows making an induction current produced by the magnetic flux supplied from heating coil 13 hard to run through shielding unit 21, so that a temperature rise of unit 21 can be further reduced. In addition to this advantage, the heat between shielding unit 21 and waveguide 16 tends to dissipate due to convection, so that a temperature rise of infrared sensor 15 due to radiation heat from shielding unit 21 can be further reduced.

Second magnetism-proofing unit 20 shapes like an arc sighted from the top and is divided into two pieces which are disposed at a space between shielding unit 21 and an inner rim (not shown) of heating coil 13. Thermistor 23 shown in dotted lines, a temperature sensing element, and its holder 22 are disposed at a space between the inner rim of heating coil 13 and waveguide 16. Thermistor 23 is urged against a top plate (not shown) by holder 22 and another urging member (not shown) such as a spring. This structure allows thermistor 23 to sense an absolute temperature near the point, where infrared sensor 15 measures a temperature of the pot base, by measuring a temperature of the rear face of the top plate. Since infrared sensor 15 is good at measuring a change in temperature; however, poor at measuring an absolute temperature, a temperature of load pot 11 can be controlled accurately with both of the foregoing temperature sensing elements. Presence of second magnetism-proofing unit 20 made of ferrite and waveguide 16 made of aluminum allows the magnetic flux from heating coil 13 to become hard to intersect with a loop formed by thermistor 23 and its wiring. As a result, high-frequency noises induced by the loop are suppressed, so that influence of the high-frequency noises to the temperature sensing circuit coupled to thermistor 23 can be suppressed.

As shown in FIG. 5, a height of heat shielding unit 21 is further lowered from that shown in FIG. 3, so that the top surface of unit 21 is approximately flush with the top face of waveguide 16. Then the infrared ray radiated from unit 21 does not enter into sensor 15, which can thus output a detection signal more steadily.

Even if infrared sensor 15 uses a wider view angle, since sensor 15 is free of influence from infrared radiation supplied from heat shielding unit 21, its accuracy of sensing a temperature can be improved.

As discussed above, the induction heating cooker of the present invention suppresses heat shielding unit 21 and waveguide 16 to heat themselves due to the magnetic flux from heating coil 13, so that a temperature rise of sensor 15 due to radiation heat from waveguide 16 or shielding unit 21. As a result, an accuracy of sensing a temperature by infrared sensor 15 can be improved.

INDUSTRIAL APPLICABILITY

The present invention can be used in induction heating cookers having a function of sensing a temperature of a load pot with an infrared sensor.

The invention claimed is:
1. An induction heating cooker comprising:
   a heating coil, having an opening at center, for providing a load pot with induction heating;
   an inverter circuit for supplying a high-frequency current to the heating coil;
   an infrared sensor, disposed under the opening, for sensing an intensity of an infrared ray radiated from the load pot;
   a temperature calculating unit for calculating a temperature of the load pot based on an output from the infrared sensor;
   a control unit for controlling an output from the inverter circuit in response to an output from the temperature calculating unit;
   a first magnetism-proofing unit, disposed under the heating coil, for converging magnetic fluxes;
   a second magnetism-proofing unit, disposed between an inner rim of the heating coil and the infrared sensor, for converging magnetic fluxes; and
   a waveguide, disposed lower than an upper surface of the second magnetism-proofing unit, for guiding an infrared ray radiated from the load pot to the infrared sensor.

2. The induction heating cooker of claim 1, wherein the upper surface of the second magnetism-proofing unit is disposed flush with a top face of the heating coil.

3. The induction heating cooker of claim 1, wherein a lower surface of the second magnetism-proofing unit is disposed lower than an upper surface of the first magnetism-proofing unit.

4. The induction heating cooker of claim 1, wherein the first magnetism-proofing unit and the second magnetism-proofing unit are unitarily formed such that a lateral sectional view thereof shows like letter "L".

5. The induction heating cooker of claim 1 further comprising a cylindrical heat-shielding unit made of nonmagnetic metal and disposed between the infrared sensor and the second magnetism-proofing unit, wherein the heat-shielding unit is disposed lower than the upper surface of the second magnetism-proofing unit.

6. The induction heating cooker of claim 5, wherein the heat-shielding unit has a slit at a part of its cylindrical body.

7. The induction heating cooker of claim 5, wherein a top face of the heat-shielding unit is disposed flush with a top face of the waveguide.

8. The induction heating cooker of claim 5, wherein another temperature sensing element, having an arc shape sighted from above, for sensing temperatures of the second magnetism-proofing unit and the load pot is disposed between the inner rim of the heating coil and the heat-shielding unit made of nonmagnetic metal.

* * * * *